May 2, 1939.  O. C. BRUN  2,156,968
METER FOR HEAT CONSUMPTION
Filed July 23, 1936
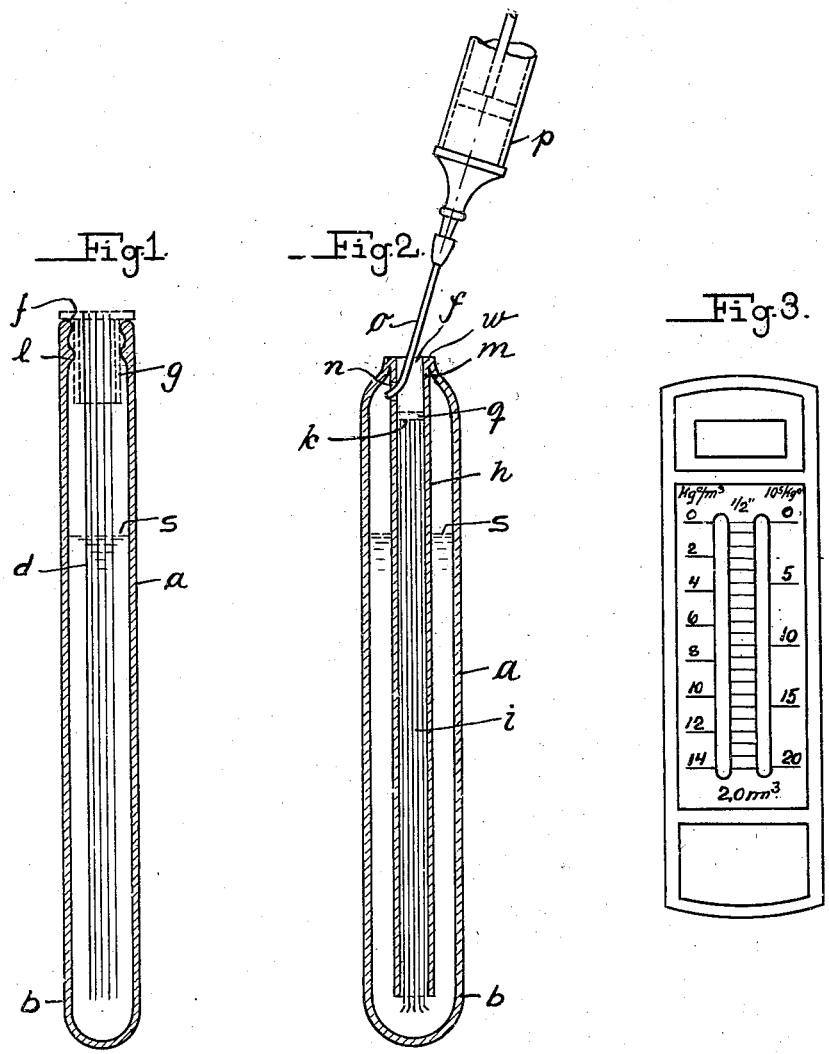
Inventor:
Oscar Constantin Brun
By [signature]
Attorneys Patented May 2, 1939

2,156,968

UNITED STATES PATENT OFFICE 2,156,968

METER FOR HEAT CONSUMPTION

Oscar Constantin Brun, Copenhagen, Denmark

Application July 23, 1936, Serial No. 92,257
In Denmark January 3, 1934

12 Claims. (Cl. 73—193)

The present invention relates to a heat-consumption meter of the kind in which a measuring liquid is filled into an open measuring vessel or container which is in heat-conducting connection with a heat-exchanging body, for instance a radiator or a hot-water pipe, the said liquid being evaporated by the heat to which it is exposed and forming thereby the means to measure the consumption of heat. The invention departs from the fact that the heat-consumption meters of this kind known heretofore, even of the best make, are constant sources of dissatisfaction, partly because the indications of the measuring apparatus, even under normal conditions of operation, are not entirely reliable, and partly because the consumer has not sufficient opportunity to ascertain that no disturbance of operation is influencing the result of the measurement. The invention has for its object to make such improvements in heat-consumption meters of the kind mentioned above that the said defects will be remedied, so that the result of the measurement will become more correct, and will be easier to check.

Experience has shown that the main causes for the unreliability of the known heat-consumption meters—if the measuring vessel of the same is made from glass, which is generally the case—are that in consequence of the manufacturing process fine grooves (capillary grooves) will be formed on the inner surface of the measuring vessel, and along the said grooves the measuring liquid will be able to creep up to the edge of the measuring vessel or over the edge, and may thereby cause an uncontrollable extra evaporation, and further that the measuring liquid evaporates not only when the heat-exchanging body, the heat-consumption of which is to be registered, is heated, but also when the same is cold, so that a heat-consumption meter of the said kind for instance also may register a consumption, even if the heat-exchanging body has not been used at all during the season concerned.

In order to remove, according to the invention, the first mentioned source of inaccuracy, a post-treatment, for instance a heating of the glass container for the measuring liquid is effected, in order to remove the said capillary grooves from the entire inner surface of the measuring vessel, or from a portion thereof. The last mentioned source of errors is eliminated by adding to the measuring fluid an admixture, which at lower temperatures impedes the evaporation of the measuring fluid to a greater extent than at higher temperatures, especially an admixture which at lower temperatures mainly collects at the surface of the measuring fluid, while at higher temperatures it becomes more intimately mixed, or emulsified, with the measuring fluid, or sinks below the surface of the same. Such an admixture may also, when the nature and quantity of the same is suitably selected, be utilized for correcting the curve of evaporation of the measuring fluid to closer conformity with the curve of heat discharged from the heat-exchanging body concerned.

Alternatively the admixture, or, when no admixture is used, the measuring liquid itself may be of such a character that it will freeze at normal room temperatures. Such a liquid or mixture may be used with particular advantage in meters with a wick member from the free surface of which the evaporation takes place because then even the sublimation of the frozen measuring liquid will very soon be altogether stopped on account of the fact that the frozen liquid cannot rise to the free surface of the wick member.

According to the invention, an improved control of the results of measurement may be attained in that the measuring fluid is given an admixture of a substance which causes changes in the colour of the measuring fluid when actuated by the heat to which the same is exposed. Thereby it becomes feasible to ascertain whether any observed lowering of the surface of the measuring liquid is really due to evaporation in consequence of the heating action of the heat-exchanging body, or to other causes, such as leaks in the measuring vessel, or the like. In order to give the consumer a better opportunity to check the indication of the meter the same may according to the invention be provided with a double scale, so that at one side the relative use of the individual heat-exchanging body, and on the other side the quantity of consumed heat may be read.

In the following, the invention is described in more detail with references to the accompanying drawing in which Fig. 1 shows a longitudinal section of a simple cylindrical measuring vessel, Fig. 2 a longitudinal section of a measuring vessel with a wick tube, as well as a device for filling the measuring liquid into the vessel, and Fig. 3 a heat-consumption meter with the special reading scale according to the invention.

The parts of the heat-consumption meter illustrated that do not form a part of the invention are not shown, and may be constructed in any suitable manner.

The simple cylindrical vessel $a$ according to Fig. 1 is made from a tube, the lower end $b$ of which is fused together. At $d$ the drawing indicates capillary grooves distributed over the inner wall of the tube, which grooves run parallel to the tube axis, and are formed by the process of manufacturing the tube. If no special precautions are taken, the measuring liquid will then, owing to capillary action, creep up through the said capillary grooves along the inner face of the vessel, and may frequently reach the edge of the opening and may, possibly, distribute itself from there over the outer surface. The process of evaporation will thereby be influenced considerably, mainly because the dimensions and number of the capillary grooves will be different in tubes otherwise similar to each other, and cannot be controlled, because these capillary grooves frequently cannot be ascertained by the naked eye. Further, the grooves will mostly become considerably more prominent during the course of time.

According to the invention, this defect which impairs the accuracy of the measurement is remedied in that any existing capillary grooves etc. are removed by a suitable treatment of the vessel containing the liquid. The surface of the measuring tube may for instance be given a coating of paraffin, metal foil, a metallic mirror backing, or a heat-resisting lacquer. Preferably transparent substances are used, in order that the surface of the liquid may always be observable. Substances having a repelling effect on the liquid may also be used as a coating. The surface, instead of being given a coating, may also be treated chemically, mechanically or thermically, for instance by etching or polishing the same. The thermic treatment is especially suitable. The glass is then simply heated so far that it comes near to the melting point, and the capillary grooves are thereby automatically caused to disappear.

It is by no means necessary to remove the capillary grooves on the entire surface of the tube. It is in fact sufficient to free merely a zone from capillary grooves, and the said zone will then form a stop for the liquid climbing along the surface of the tube owing to capillarity. Thus it is sufficient when the tube is heated along the edge of its aperture in the manner mentioned above, so that the liquid cannot rise clear to the edge. In the vessel according to Fig. 1, the last mentioned procedure has been followed, the capillary grooves at the upper part $e$, i. e. at the evaporation aperture $f$, having been removed by heating the tube to a temperature close to the fusing point. The upper region $e$ of the wall will therefore be entirely freed from capillary grooves, so that liquid can never climb all the way up to the edge and above the same. The change in the clear width between the aperture $f$ and the liquid surface $s$ effected under certain circumstances by the deformation due to the heating does not impair the accuracy of measurement, because the diameter at this point has no substantial influence on the diffusion. Only the diameter directly at the opening $f$ has a certain influence, but in practice the change in this diameter is similarly unimportant. Any defect in this direction, however, can be remedied by the insertion, from above, of a calibrated sleeve $g$, which is alike for all vessels.

The vessel $a$ according to Fig. 2 is constructed in similar manner as the vessel $a$ according to Fig. 1, but contains further a wick tube $h$, which is open at both ends, and terminates at the bottom closely above the fused end $b$, and contains a wick $i$ for instance of braided wires serving to maintain the evaporation surface of the liquid contents constantly at the same level at the point $k$.

As shown in dotted lines a porous pad $q$ may, according to the invention, be placed at the top of the wick whereby the constancy of the evaporation conditions may be still further secured, i. e. because the rate of evaporation will be altogether independent of the character of the top surface of the wick.

At the upper edge $m$ of the tube $h$, the same is united, by fusion, to the edge of the vessel, and consequently no special packing devices are required. The vessel $a$ and the tube $h$ form in fact an integral unit. By joining the two tubes, by fusion, at the point $w$, the capillary grooves due to the manufacture are further removed, so that the liquid cannot leave the aperture $f$ on account of capillarity. The pressure-equalizing aperture $n$ is situated directly at the edge of the aperture $f$ of the tube $h$. The aperture $n$ has therefore such a position that a filling tube, for instance the cannula $o$ of a syringe $p$ conveniently can be inserted. The syringe $p$ is dimensioned in such a manner that it can hold just the quantity required for filling one meter.

On the basis of the examples described, any expert will easily be able to perform a suitable heat-treatment, or other treatment, for instance chemical, mechanical or thermic, on open measuring vessels of any desired construction.

As already mentioned, an undesired evaporation of the measuring liquid will not be absolutely prevented, even if a removal of the capillary grooves has taken place, as described above. Such an undesired evaporation may in fact take place when the heat-exchanging body, the heat consumption of which is to be measured, is standing in room temperature, as the rate of evaporation at room temperature, although considerably lower than the rate of evaporation at higher temperatures, nevertheless will not be entirely negligible. In order that the meter may work to satisfaction, the condition must in fact be filled that no appreciable evaporation of the measuring liquid may take place at temperatures below 25–30° C.

As regards the removal of this drawback, the invention is based on the recognition of the fact that an important change in the evaporation conditions of a liquid exposed to varying temperatures can be caused by the admixture of some suitable substance. If for instance a thin layer of oil or fat is added to water, the result will be that the water only to a very slight extent will be able to evaporate at ordinary temperature, as the oil or fat will collect on the liquid as a continuous layer preventing the passage of water vapour. When the temperature is raised, the continuity of the layer of fat or oil will be broken, so that an evaporation of the water now can take place. Alcohol, on the surface of which a layer of paraffin or the like has been deposited, will act in a corresponding manner.

According to the invention, this fact is utilized to reduce a too lively evaporation at temperatures lower than 25–30° C. by giving the measuring liquid an admixture having the described effect. The invention is not tied to any definite explanation of the processes going on, but it should be noted that by a simple experiment one can easily ascertain whether a certain admixture to a given measuring fluid has the described effect, i. e. reduces the evaporation more effectively at lower temperatures than at higher temperatures.

It may be mentioned, however, that the effect of the substance to be added may consist, for instance, in that the same is more soluble in the measuring liquid at higher temperatures than at lower temperatures, so that at lower temperatures the substance will collect mainly on the surface of the measuring fluid, the substance having in such cases to have a lower specific gravity than the measuring fluid, while at higher temperatures the substance will mainly become mixed with the measuring liquid, so that the surface of the latter will be free to evaporate. The mixture may be homogeneous or more or less heterogeneous, and may for instance also have the nature of an emulsion or suspension. Also mutually differing variations in the surface tension and the specific gravity of the measuring liquid and the substance admixed, all depending on the temperature, may in some cases be utilized as causes assisting in attaining the effect aimed at by the invention.

The substance to be added will not necessarily have to be a chemically pure substance, but may on the contrary also be a homogeneous or more or less heterogeneous mixture of various substances.

If the effect attained by the invention is dependent on the feature that the admixed substance is soluble in the measuring liquid at higher temperatures, the filling in of the measuring liquid into the measuring vessel should preferably be effected at a high temperature, i. e. the measuring liquid is heated before the filling, and thereby it becomes possible, in simple manner to attain the proper mixing of the admixed substance and the measuring liquid. The substance admixed should be less volatile than the measuring fluid.

As has already been mentioned the admixture or, when no admixture is used, the measuring liquid itself, may also be of such a character, that the measuring liquid or mixture will freeze or stiffen at lower temperatures such as ordinary room temperatures. When this freezing or stiffening has taken place the evaporation will be replaced by a sublimation which may take place at a substantially slower rate than the evaporation. It has also been mentioned, that when a meter with a wick tube is used even the sublimation will very soon be stopped because the frozen or stiffened measuring liquid cannot penetrate through the wick member to the free surface of the same.

As mentioned in the preamble, it is possible to provide an indication as to whether the lowering of the surface of the measuring liquid is really due to the thermic influence of the heat-exchanging body, by admixing to the measuring liquid a substance causing the colour of the liquid to alter when the latter is exposed to the influence of heat. The colour of the measuring fluid, at the time when the reading is performed, for instance at the end of the season, will then give the desired indication. The observation of the colour of the measuring fluid may be effected by using well known means for comparing the colour of a liquid with a scale of colours. When an alcohol is used as a measuring liquid, the substance to be added may for instance be a mixture of methyl-violet and Sudan red, in which case the colour shading due to the methyl-violet will gradually disappear by the influence of heat, so that the colour shading due to the Sudan red will become more and more prominent, gradually as the heat action increases.

The above mentioned substance which is added to the measuring fluid for the purpose of impeding the evaporation at lower temperatures may, if desired, be combined with the colour substance added, or the latter may be added separately, may be as a substance serving to discolour a previously added colour substance or, vice versa, as a colour substance serving to increase the colour effect on account of the temperature influence.

Any possible combination of colour substances with the liquid, may be in co-operation with the liquid's own colour, or that of the admixed substance or substances, which serve to impede the evaporation at lower temperatures, will come within the scope of the invention.

Fig. 3 shows a heat-consumption meter, the scale of which is constructed in a special manner facilitating the reading and control of the indication of the meter. In the example shown there are provided in front of the measuring vessel, two parallel slits in the scale, through which slits the level of the liquid can be observed. The lighting of the measuring liquid will thereby become far more suitable than in the case of only one single narrow slit, and nevertheless the drawbacks attached to the use of one single wide slit will be avoided at the same time, namely partly that a large portion of the measuring vessel will be visible behind the slit, which is not favourable to the reading, and partly that the measuring vessel will be highly exposed to mechanical injury, or to undue cooling. If a measuring vessel with a wick tube is used, the scale may be placed in such a manner that the slits of the same will be situated on either side of the wick tube, which means a special advantage, in that an observation of the wick tube, in which the level of the liquid is different from the level to be read off, will be confusing.

An important feature of the scale is that different scale divisions are provided at the sides of the respective slits, namely one division indicating the relative heat consumption, i. e. the heat consumption relatively to the capacity of the heat-exchanging member, e. g. in the case of a radiator, heat units per square meter, and another division indicating the absolute value of the heat consumption. Thereby the consumer is enabled not only to read the heat consumption but also to directly compare the degree of use of the different heat exchanging members and ascertain whether there is a reasonable relation between the different readings.

Such different scale divisions may of course also, according to the invention, be placed at each side of one single slit.

The invention is of course not limited to the details described and shown, but may be varied in many manners, within the scope of the invention, in respect of the shape of the measuring vessel used, and also in respect to the nature of the measuring liquids and admixtures used.

Having now particularly described and ascertained the nature of my said invention and in what manner the same is to be performed, I declare that what I claim is:

1. A meter for heat consumption of the vaporiser type, comprising an open glass container adapted to contain a measuring liquid which will evaporate on heating, the capillary grooves in the inner surface of which glass container, resulting from its production, have been removed from portions of the container walls other than those portions connected to adjacent portions by fusing; and a scale for readily reading the level of the said measuring liquid.

2. A meter for heat consumption of the vaporiser type, comprising an open glass container adapted to contain a measuring liquid, the capillary grooves in the inner surface of which glass container, resulting from its production, have been removed from portions of the container walls other than those portions connected to adjacent portions by fusing, by heating such portions at a temperature near the melting point of the glass.

3. A meter for heat consumption of the vaporiser type, comprising an open glass container adapted to contain a measuring liquid, the edge portions of the opening of which glass container other than edge portions connected to adjacent portions by fusing, have been heated, after the production of the container, to a temperature near the melting point of the glass in order to remove the capillary grooves in the inner surface of the container, resulting from the production of the container, from the said edge portions.

4. A meter for heat consumption of the vaporiser type, comprising a liquid container, a wick tube communicating with the interior of the said container, a wick member arranged in the wick tube, and a porous pad on the said wick member, such pad offering a constant level active evaporation surface for the measuring liquid, while the main level of the measuring liquid is sinking outside the wick tube.

5. In a meter for heat consumption comprising an open vaporiser vessel, a measuring liquid therein, and a substance added to said liquid for checking the evaporation of the measuring liquid more at lower temperatures than at higher temperatures, so as to bring the curve of evaporation of the measuring liquid into closer conformity with the curve of heat exchange of the heat exchanging device, the heat consumption of which is to be measured.

6. In a meter for heat consumption comprising an open vaporiser vessel, a measuring liquid therein, and a substance added to said liquid which substance does not substantially effect the evaporation of the measuring liquid at ordinary working temperatures, but prevents or substantially checks evaporation at ordinary room temperatures and lower temperatures.

7. In a meter for heat consumption comprising an open vaporiser vessel, a working liquid therein, and a substance added to said liquid which substance is mixed with or dissolved in the liquid at higher temperatures, but at lower temperatures separates from the measuring liquid and forms a layer on its surface, thus preventing or substantially checking the evaporation of the measuring liquid.

8. In a meter for heat consumption of the vaporiser type including a vaporiser vessel, a measuring liquid in said vessel, said liquid having in itself or on account of an admixture such characteristics that it will freeze or stiffen at ordinary room temperature.

9. In a meter as defined in claim 8, the vessel having a wick tube containing a wick member.

10. In a meter for heat consumption, an open vaporiser vessel, and a measuring liquid therein comprising alcohol with an addition of a blocking liquid including paraffin.

11. In a meter for heat consumption, an open vaporiser vessel, and a measuring liquid therein, the colour of which is varied or modified according to the time of influence of heat.

12. In a meter for heat consumption, an open vaporiser vessel, and a measuring liquid comprising alcohol with an addition of a coloring liquid including methyl-violet and Sudan red.

OSCAR CONSTANTIN BRUN.